Figure 1:
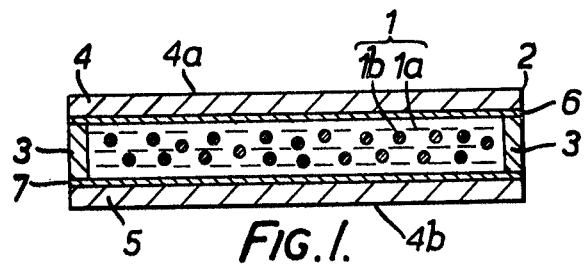

United States Patent [19]

Carter et al.

[11] 4,093,534
[45] June 6, 1978

[54] WORKING FLUIDS FOR ELECTROPHORETIC IMAGE DISPLAY DEVICES

[75] Inventors: Christopher Frederick Carter, Wooton; Roy Trevor Blunt, Towcester; James Cyril Alexander Lewis; Geoffrey Michael Garner, both of Northampton, all of England

[73] Assignee: Plessey Handel und Investments AG, Zug, Switzerland

[21] Appl. No.: 547,338

[22] Filed: Feb. 5, 1975

[30] Foreign Application Priority Data

Feb. 12, 1974 United Kingdom ............... 06276/74
Jul. 19, 1974 United Kingdom ............... 32047/74

[51] Int. Cl.² .......................... C25D 1/12; B03C 5/00
[52] U.S. Cl. ............................... 350/355; 204/299 R; 96/1 A
[58] Field of Search ............... 204/180 R, 130 P, 299, 204/300; 96/1 A; 252/62.1 L

[56] References Cited

U.S. PATENT DOCUMENTS

| | | | |
|---|---|---|---|
| 3,078,231 | 2/1963 | Metcalfe et al. | 252/62.1 L |
| 3,135,695 | 6/1964 | York | 252/62.1 L |
| 3,259,581 | 7/1966 | Matkan | 252/62.1 L X |
| 3,337,340 | 8/1967 | Matkan | 252/62.1 L X |
| 3,607,256 | 9/1971 | Silverberg | 204/299 X |
| 3,668,106 | 6/1972 | Ota | 204/299 |
| 3,684,683 | 8/1972 | Ota | 204/181 PE X |
| 3,689,399 | 9/1972 | Ota | 204/299 |
| 3,689,400 | 9/1972 | Ota et al. | 204/299 X |
| 3,874,896 | 4/1975 | Machida et al. | 252/62.1 X |
| 3,900,412 | 8/1975 | Kosel | 252/62.1 L X |
| 3,984,298 | 10/1976 | Haber | 204/180 R X |

Primary Examiner—Arthur C. Prescott
Attorney, Agent, or Firm—Fleit & Jacobson

[57] ABSTRACT

The invention provides a working fluid for an electrophoretic image display device including a dispersion of a species of finely divided particles of an opaque dielectric material suspended in a suspension medium, each of the said particles which are transportable within the suspension medium under the influence of an electric field, has a chemical compound adsorbed on the surface thereof, the chemical compound is such that the molecules thereof exert an attractive force towards each other in the absence of the electric field.

16 Claims, 9 Drawing Figures

WORKING FLUIDS FOR ELECTROPHORETIC IMAGE DISPLAY DEVICES

The invention relates to working fluids for electrophoretic image display devices and to electrophoretic image display devices which utilise the working fluids.

The invention provides a working fluid for an electrophoretic image display device including a dispersion of a species of finely divided particles of an opaque dielectric material suspended in a suspension medium each of the said particles which are transportable within the suspension medium under the influence of an electric field, has a chemical compound adsorbed on the surface thereof, the chemical compound being such that the molecules thereof exert an attractive force towards each other in the absence of the electric field.

According to a feature of the invention a working fluid as outlined in the preceding paragraph is provided wherein the said dispersion includes at least one other species of finely divided opaque particles suspended in the suspension medium, each of the species and the suspension medium being of contrasting colours, wherein the said one other species is transportable within the suspension medium under the influence of the electric field and wherein the said species are adapted to acquire oppositely charged conditions.

The invention also provides an electrophoretic image display device which utilises the working fluid outlined in either of the preceding paragraphs. The image display device can include an array of individually addressable image display elements and means for individually addressing each of the elements.

The foregoing and other features according to the invention will be better understood from the following description with reference to the accompanying drawings, in which:

FIG. 1 diagrammatically illustrates an electrophoretic image display device in a cross-sectional side elevation, FIGS. 2 to 5 diagrammatically illustrate an electrophoretic image display device according to the invention in each of the four modes that the device can assume.

Figure 6:
Figure 8:
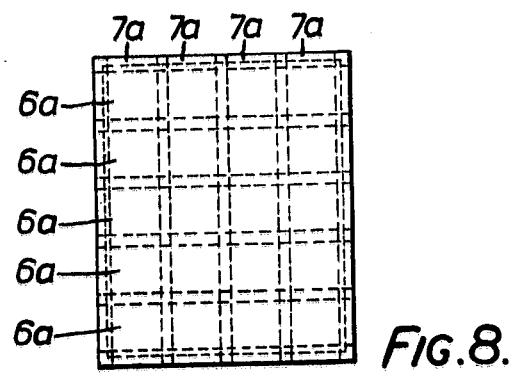
Figure 7:
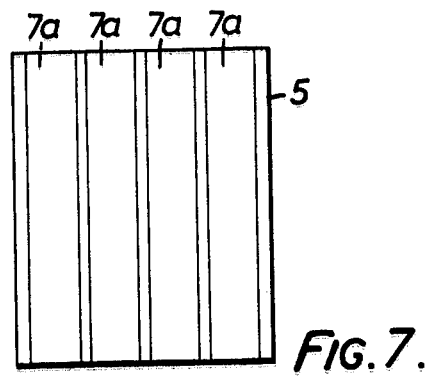
Figure 9:
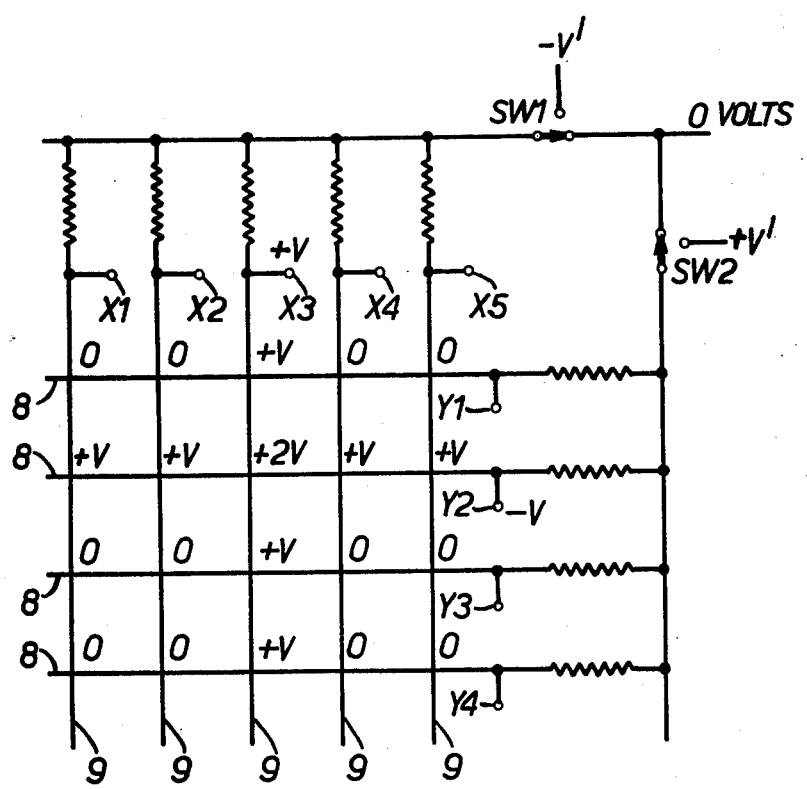

FIGS. 6 to 8 diagrammatically illustrate parts of a co-ordinate addressed image display device, and FIG. 9 diagrammatically illustrates an equivalent electrical circuit for a co-ordinate addressed image display device and the associated addressing circuitry.

An electrophoretic image reproduction device is diagrammatically illustrated in FIG. 1 of the drawings in a cross-sectional side elevation and includes a working fluid 1 enclosed in a housing 2 consisting of an electrically insulating frame shaped member 3 secured between members 4 and 5 of, for example, an electrically insulating material such as glass, polyester, cellulose acetate, regenerated cellulose or polyethylene. Electrodes 6 and 7, for example of metal, cuprous iodide or tin oxide, are respectively attached to the inner surfaces of the members 4 and 5 and are in contact with the working fluid 1. At least one of the members 4 and 5 and its associated electrode will be transparent, and the non-transparent member and the associated electrode may be formed by a metallic member.

The working fluid 1 includes a dispersion of finely divided particles 1$b$ of an opaque dielectric material such as titania suspended in a coloured, essentially non-conducting suspension medium 1$a$. The particles 1$b$ are shown greatly enlarged for the sake of clarity, but, in practice, it is thought that the dimensions of the particles 1$b$ must not be greater than approximately 1/10 of the spacing between the electrodes 6 and 7. In a practical arrangement the spacing between the electrodes 6 and 7 could be about 0.0015 inches.

In operation, the electrodes 6 and 7 are connected to a direct voltage source (not illustrated) the polarity of which can be reversed. Initially, in the absence of an electric field between the electrodes, the particles 1$b$ are, as is illustrated in FIG. 1, distributed uniformly throughout the suspension medium 1$a$. If, for example, the particles 1$b$ are white and the suspension medium 1$a$ is black, the working fluid 1 will, in the absence of an electric field, appear grey when illuminated by an incandescent lamp. When the grey working fluid is subjected to a unidirectional electrical field as a result of the application of the direct voltage source to the electrodes 6 and 7, the particles 1$b$ are caused to move electrophoretically in the direction either of the cathode electrode or the anode electrode depending on the polarity of their charge. If, for example, the particles 1$b$ acquire a negative charge and the electrode 6 is the anode electrode, then the particles 1$b$ will migrate towards, and will be deposited on the surface of, the electrode 6. Under these conditions, spatial distribution of the particles 1$b$ in the suspension medium 1$a$ will be different from the initial uniform distribution illustrated in FIG. 1, and, therefore, the working fluid 1 will have different optical reflectance properties from those of the original working fluid illustrated in FIG. 1. With the exampled working fluid given above, the electrophoretic image display device will, under these conditions, appear white at the surface 4$a$ and black at the surface 4$b$, if the insulating members 4 and 5 and the electrodes 6 and 7 are all transparent.

The colour appearing at the surfaces 4$a$ and 4$b$ of the image display device of FIG. 1 can be reversed by reversing the polarity of the voltage that is applied between the electrodes 6 and 7.

The particles 1$b$ used in the working fluid 1 are subject to various interaction forces apart from those due to the applied field and in the working fluids according to the present invention these interaction forces are modified in order to achieve a marked non-linear relationship between particle transportation and the applied electric field. This non-linearity which is achieved by using opaque dielectric particles of a material such as titania and by adsorbing onto the surface of each particle any one of the chemical compounds to be subsequently outlined, produces a voltage threshold for the working fluids in that particle transportation within the suspension medium 1$a$ will not occur until this threshold is reached or is exceeded. The chemical compound which, as will be subsequently outlined, should preferably be capable of forming hydrogen bonds or strong dipoles, is such that it causes the attractive force between coated particles to be substantially greater than that between two uncoated particles, or such that it causes the attractive force between a coated particle and an electrode to be substantially greater than that between an uncoated particle and an electrode. One class of adsorbate which has been found to be particularly effective in increasing the attractive force between particles, or between particles and electrodes, thus producing a threshold, is that class known as "polyols" i.e. organic compounds containing a number of hydroxyl groups, for example pentaerythritol, poly(ethylene glycol) and poly(vinyl alcohol). However, other chemical compounds such as poly(ethylene oxide), urea and even water have also been adsorbed onto titania surfaces to produce thresholds.

Whilst there may be many ways in which the adsorption of these chemical compounds can lead to an increase in the attractive force between particles, it is thought that one possible way is by the formation of hydrogen bonds; it is well known that such bonds can be formed between the molecules of compounds in which hydrogen is attached to a more electronegative atom such as nitrogen or oxygen, as in most of the compounds listed above. Calculations indicate that the strengths of such bonds are of the right order of magnitude to account for the observed thresholds, but the possibility of effects of a similar order of magnitude arising, for example, from the interaction between dipoles generated by the adsorption of polar materials which do not form hydrogen bonds cannot be ruled out.

It has been found with the working fluids according to the invention that reversible switching can be obtained with an acceptable response time and voltage threshold which in practice is of a value greater than one third of the operating voltage but less than the operating voltage.

One example of a working fluid according to the invention includes a dispersion of finely divided alumina treated titania powder particles which are coated with pentaerythritol, suspended in a solution of Sudan Black dye in diethyl phthalate. The pentaerythritol coating is applied to the alumina treated titania powder particles by adsorption from an aqueous solution. A typical formulation for this working fluid which gives a blue mixture, is 0.7 gm of the coated titania powder particles intimately mixed with 2.5 cm$^3$ of diethyl phthalate and 0.02 gm of Sudan Black dye. It was found with this working fluid that reversible switching could be obtained in the device of FIG. 1 with a voltage threshold of approximately 9 volts when the spacing between the electrodes 6 and 7 was 0.0015 inches.

Another example of a working fluid according to the invention includes a dispersion of finely divided Irgalite yellow 8GF pigment coated with polyvinyl alcohol (molecular weight 90,000) suspended in a solution of Sudan Black dye in amyl acetate. The Irgalite yellow 8GF pigment is a 2Hydroxy 1 naphthaldehyde azine pigment produced by CIBA GEIGY (UK) Ltd. The polyvinyl alcohol is applied to the Irgalite yellow pigment by adsorption from an aqueous solution. A typical formulation for this working fluid which gives a green paste, is 0.2 gm of the coated pigment intimately mixed with 2.5 cm$^3$ of amyl acetate and 0.01 gm of Sudan Black dye. It was found with this working fluid that reversible switching could be obtained in the device of FIG. 1 with a voltage threshold of approximately 5 volts when the spacing between the electrodes 6 and 7 was 0.0015 inches.

As is illustrated in FIGS. 2 to 5 of the drawings, the working fluid 1 can include a dispersion of at least two species 1b and 1c of opaque dielectric particles suspended in a coloured, essentially non-conducting suspension medium 1a. The species 1b and 1c and the suspension medium 1a are of contrasting colours, and the species 1b and 1c are adapted to acquire oppositely charged conditions. For example, the particles 1b can be of an inorganic white pigment and capable of acquiring a positive charge, the particles 1c can be of an organic yellow pigment and capable of acquiring a negative charge and the suspension medium 1a can be of a solution of a blue dye in a hydrocarbon liquid.

The particles 1b and 1c are transportable within the suspension medium when subjected to an applied electric field and these particles are also subjected to various interaction forces previously referred to. In the working fluid 1 of FIGS. 2 to 5 these interaction forces for one of the two species 1b and 1c are modified in a manner as outlined in preceding paragraphs in order to achieve the marked non-linear relationship previously referred to.

It should be noted that charge control agents may also be incorporated in the working fluid of FIGS. 2 to 5.

For the purposes of the following description it will be assumed that the colours of the constituents of the working fluid 1 of FIGS. 2 to 5 are as given in the example previously quoted, that the white particles 1b have been processed to give the threshold behaviour outlined in the preceding paragraphs, that the member 4 and the associated electrode 6 are transparent and that the particles 1b and 1c acquire the charged condition given in the previously quoted example.

It should be noted that the particles 1b and 1c are shown greatly enlarged for the sake of clarity, but, in practice, it is thought that the dimensions of the particle 1b and 1c must not be greater than approximately 1/10 of the spacing between the electrodes 6 and 7. In a practical arrangement the spacing between the electrodes 6 and 7 could be about 0.0015 inches.

Figure 2:
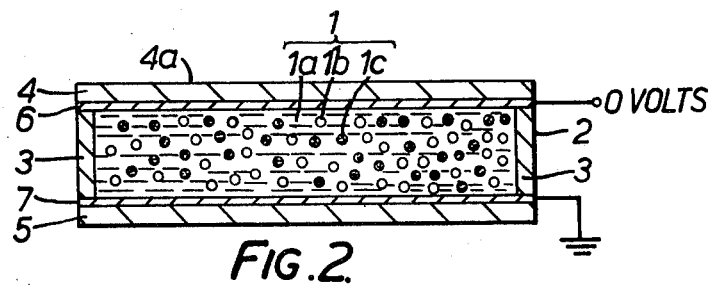

In operation, the electrodes 6 and 7 are connected to a direct voltage source (not illustrated) the polarity of which can be reversed. Initially, in the absence of an electric field between the electrodes, the particles 1b and 1c are, as is illustrated in FIG. 2, distributed uniformly throughout the suspension medium 1a. The working fluid 1 will, therefore, under these conditions, have a colour which is a mixture of the colours of the particles 1b and 1c and the suspension medium 1a.

Figure 3:
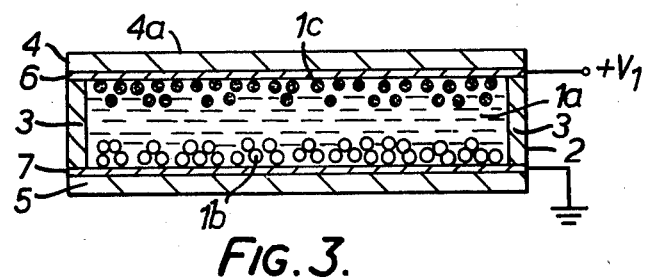

If a positive voltage, V, is applied to the electrode 6 and if the electrode 7 is connected to earth potential, then the negatively charged yellow particles 1c will be attracted towards, and will be deposited on the surface of the electrode 6. Under these conditions, the spatial distribution of the particles 1b and 1c in the suspension medium 1a will be as is illustrated in FIG. 3, and a yellow colour will be seen when the display is viewed via the transparent electrode 4.

Figure 4:
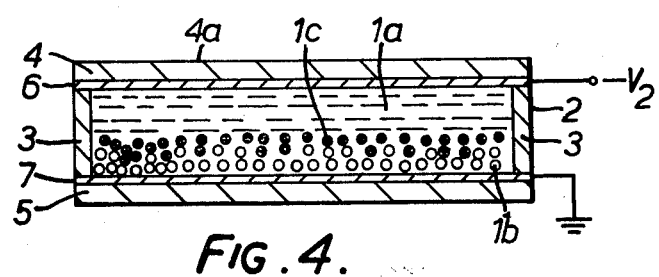

If a negative voltage, $-V_2$, of lower magnitude than the voltage threshold $V_T$ is applied to the electrode 6 with the electrode 7 at earth potential, then the negatively charged yellow particles 1c will be attracted towards, and will be deposited on the surface of, the electrode 7. Also, since the threshold voltage $V_T$ has not been reached the positively charged white particles 1b will not reach the surface of the electrode 6. Under these conditions, the spatial distribution of the particles 1b and 1c in the suspension medium 1a will be as is illustrated in FIG. 4, and the blue colour of the suspension medium 1a will be seen when the display is viewed via the transparent electrode 4.

Figure 5:
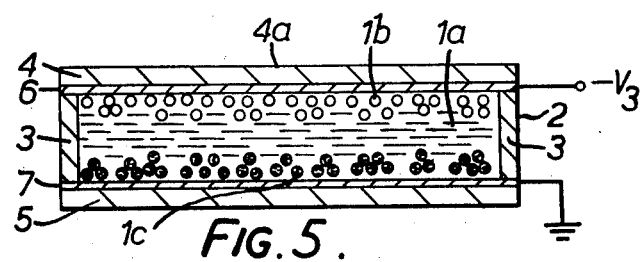

The application of a more negative voltage, $-V_3$, of a magnitude greater than the threshold value $V_T$ to the electrode 6 will cause the positively charged white particles to be attracted towards, and to be deposited on the surface of, the electrode 6. Under these conditions, the spatial distribution of the particles 1b and 1c in the suspension medium 1a will be as is illustrated in FIG. 5 and a white colour will be seen when the display is viewed via the transparent electrode 4.

In practice, for the exampled working fluid 1 given in a preceding paragraph, the voltage $V_1$ would be 60 volts, the voltage $V_2$ would be 10 volts, the voltage $V_T$ would be 12 volts and the voltage $V_3$ would be 60 volts.

The voltage threshold effects of the working fluids according to the invention can be used to advantage in many applications such as storage oscilloscopes, large element displays, memory systems and can, in particular be used in the co-ordinate-addressed electrophoretic image display devices according to the invention, for example co-ordinate-addressed image display devices in which M×N dots are individually addressed using M+N lead-outs.

With a co-ordinate-addressed device, the electrodes 6 and 7 would, as is respectively diagrammatically illustrated in FIGS. 6 and 7 of the drawings, be divided into a number of strips or bars 6a and 7a. In the completed device the bar electrodes 6a would, as is diagrammatically illustrated in FIG. 8 of the drawings, be arranged transversely of the bar electrodes 7a in order to provide at each crossing of the bar electrodes 6a and 7a an image reproduction element, each element of this two-dimensional array being individually addressable when the voltage threshold effects of the working fluids according to the invention are utilised.

FIG. 9 diagrammatically illustrates an equivalent electrical circuit for a co-ordinate-addressed image display device according to the invention and the associated addressing circuitry. The bar electrodes 6a and 7a of FIGS. 6 to 8 having the working fluid of FIG. 1 situated therebetween are respectively represented by the lines 8 and 9. The lines 8 are each connected to a separate one of the terminals Y1 to Y4 and to one side of a common switch SW2 via a resistance. The lines 9 are each connected to a separate one of the terminals X1 to X5 and to one side of a common switch SW1 via a resistance.

The switch SW1 is adapted to connect the lines 9 to either zero volts or $-V'$ volts and the switch SW2 is adapted to connect the lines 8 to either zero volts or $+V'$ volts.

It will be assumed that the voltage threshold effects of the device permits addressing by 'one-half select'. It will also be assumed that the display device is to be viewed in such a way that the bar electrodes represented by the lines 9 are nearer to the viewer than those represented by the lines 8, so that the "off" state of the device may be defined as that state in which the pigment particles are deposited on the bar electrodes represented by the lines 8.

Initially, the individual elements of the device are all switched to an 'off' state by allowing the terminals Y1 to Y4 and the terminals X1 to X5 to float and by connecting the lines 8 to the $+V'$ volts supply via the switch SW2 and the lines 9 to the $-V'$ volts supply via the switch SW1. This will cause a voltage of $-2V'$ volts to be applied between the electrodes of each of the individual elements. Under these conditions and assuming that the particles 1b have a negative charge thereon, the individual elements will be driven to the 'off' state. The switches SW1 and SW2 are then operated to connect, as indicated in FIG. 9, the lines 8 and 9 to the zero volts terminal.

The addressing cycle can now commence by applying a $+V$ voltage to the appropriate one of the terminals X1 to X5, say terminal X3, and a $-V$ voltage to the appropriate one of the terminals Y1 to Y5, say terminal Y2. Under these conditions, the voltages between the bar electrodes at each crossing will be as is indicated in FIG. 9. Since only 'fully-selected' elements will be switched to the 'on' state, the selected element at the crossing of the bar electrodes associated with the terminals X3 and Y2 will be switched 'on' and all other elements will remain in the 'off' state. The selected element will remain in the 'on' state even if the power supply is removed and will not be returned to the 'off' state until an appropriate reverse voltage is applied across the associated bar electrodes.

Other elements of the matrix can now be switched to the 'on' state by sequentially applying the $+V$ and $-V$ voltages respectively to the appropriate ones of the terminals X1 to X5 and the terminals Y1 to Y4.

It should be noted that the voltage $V'$ used to bring the display to its 'off' state may be, but is not necessarily, equal to the addressing voltage V (FIG. 9).

It should also be noted that whilst 'one-half select' addressing has been utilised, the working fluid according to the invention will permit addressing by 'one-third select' or any other addressing system within the specified voltage threshold effects.

The multi-colour working fluids according to the invention can also be used in a similar manner in the co-ordinate-addressed electrophoretic image display devices outlined in preceding paragraphs to produce multi-coloured images.

It can, therefore, be seen from the foregoing that the working fluids and devices according to the invention can have specific optic-electric properties tailored to meet the needs of multiplexing and co-ordinate-addressing by the provision of a marked threshold effect in the driving voltage/optical contrast ratio characteristics which permits co-ordinate-addressing by 'one-half select', 'one-third select' or other addressing systems. In addition, the working fluids are such that the power supply can be removed from the device after the image has been displayed without causing erasure of the image, which will remain clearly visible for long periods without the need for 'refreshment'. The image, can, of course, be easily erased in the manner outlined in preceding paragraphs and a new image can then be generated and displayed.

It is to be understood that the foregoing description of specific examples of this invention is made by way of example only and is not to be considered as a limitation in its scope.

What is claimed is:

1. A working fluid for an electrophoretic image display comprising a dispersion of a species of finely divided particles of an opaque dielectric material suspended in a suspension medium, each of said particles having a chemical compound adsorbed onto the surface thereof and forming a coating thereon such that repulsive forces between the particles are modified by short range attractive interactions of functional groups possessed by the chemical compound, and wherein said coated particles undergo selected transportation in dependence upon an applied electric field having a potential equal to or greater than the voltage threshold created by the dipole interaction between said coated particles.

2. A working fluid as claimed in claim 1 wherein the said dispersion includes at least one other species of finely divided opaque particles suspended in the suspension medium being of contrasting colours, wherein the one other species is capable of selective transportation in dependence upon the potential of the applied electric field, and wherein the two species are of different chemical composition such that when dispersed in said suspension medium, each species is oppositely charged.

3. A working fluid as claimed in claim 1 wherein said chemical compound is selected from the group consisting of an organic compound containing a number of hydroxyl groups, polyethylene oxide and water.

4. A working fluid as claimed in claim 3 wherein said chemical compound is selected from the group consisting of pentaerythritol, polyethylene glycol, polyvinyl alcohol and urea.

5. A working fluid as claimed in claim 1 wherein said species of finely divided particles having the chemical compound adsorbed thereon is titania.

6. A working fluid as claimed in claim 5 wherein said chemical compound is alumina.

7. A working fluid as claimed in claim 6 wherein said alumina coated titania particles have pentaerythritol adsorbed on the surface thereof.

8. A working fluid as claimed in claim 7 wherein said suspension medium is a solution of Sudan Black dye in diethyl phthalate.

9. A working fluid as claimed in claim 8 wherein said working fluid has a composition consisting essentially of 0.7 gm of the pentaerythritol coated alumina coated titania particles intimately mixed with 2.5 cm$^3$ of diethyl phthalate and 0.02 gm of Sudan Black dye.

10. A working fluid as claimed in claim 1 wherein said species of finely divided particles having the chemical compound adsorbed on the surface thereof is 2-Hydroxy, 1 naphthaldehyde azine.

11. A working fluid as claimed in claim 10 wherein the said azine pigment particles have polyvinyl alcohol absorbed on the surface thereof to form said coating.

12. A working fluid as claimed in claim 11 wherein said suspension medium is a solution of Sudan Black dye in amyl acetate.

13. A working fluid as claimed in claim 2 wherein said working fluid has a composition consisting essentially of 0.2 gm of the polyvinyl alcohol coated azine pigment particles intimately mixed with 2.5 cm$^3$ of amyl acetate and 0.01 gm of Sudan Black dye.

14. A working fluid as claimed in claim 2 wherein the chemical composition of the particles of one of the species comprises an inorganic white pigment and the chemical composition of the particles of the one other species comprises an organic yellow pigment, each of said species being oppositely charged, said suspension medium further comprising a solution of blue dye in a hydrocarbon liquid.

15. An electrophoretic image display device including a working fluid, said working fluid comprising a dispersion of a species of finely divided particles of an opaque dielectric material suspended in a suspension medium, wherein each particle has a chemical compound adsorbed onto the surface thereof and forming a coating therein such that repulsive forces between the particles are modified by short range attractive interactions of functional groups possessed by the chemical compound, and wherein said coated particles undergo selective transportation in dependence upon an applied electric field having a potential equal to or greater than the voltage threshold created by the dipole interaction between said coated particles.

16. An electrophoretic image display device comprising an array of individual addressable image display elements, said array including a working fluid comprising a dispersion of a species of finely divided particles of an opaque dielectric material suspended in a suspension medium, wherein each particle has a chemical compound adsorbed onto the surface thereof and forming a coating thereon such that repulsive forces between the particles are modified by short range attractive interactions of functional groups possessed by the chemical compound, and wherein the coated particles undergo selective transportation in dependence upon an applied electric field having a potential equal to or greater than the voltage threshold created by the attractive interaction thus generated between said coated particles.

* * * * *